Feb. 20, 1934.     W. E. CRAWFORD     1,948,337
INDICATING SYSTEM FOR WELDING MACHINES
Filed Aug. 17, 1931

INVENTOR.
William E. Crawford
BY
ATTORNEY.

Patented Feb. 20, 1934

1,948,337

UNITED STATES PATENT OFFICE 1,948,337

INDICATING SYSTEM FOR WELDING MACHINES

William E. Crawford, Wauwatosa, Wis., assignor to A. O. Smith Corporation, Milwaukee, Wis., a corporation of New York Application August 17, 1931. Serial No. 557,485

10 Claims. (Cl. 219—4)

The invention relates generally to indicating systems for welding machines.

The object of the invention, generally stated, is to provide an indicating system for electric welding machines which shall be simple and efficient in operation and readily and economically manufactured.

A more specific object of the invention is to provide for indicating the welding conditions that prevail at different portions of a cleft to be welded to guide the operator in the operation of a flash welding machine.

Another object of the invention is to provide for indicating the conditions that exist at different portions of a long welding cleft in a manner that may be readily observed by the operator.

It is also an object of the invention to provide for indicating differences in welding conditions along a cleft by a display of a large number of pointers, and substantially similar welding conditions throughout the welding cleft and the electric current flowing by a single pointer to facilitate the observance of the proper current conditions for completing the weld.

For a fuller understanding of the nature and objects of the invention, reference may be had to the following detailed description taken in conjunction with the accompanying drawing, in which.

Figure 4:
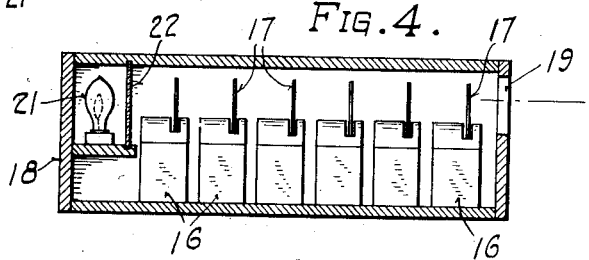
Figure 5:
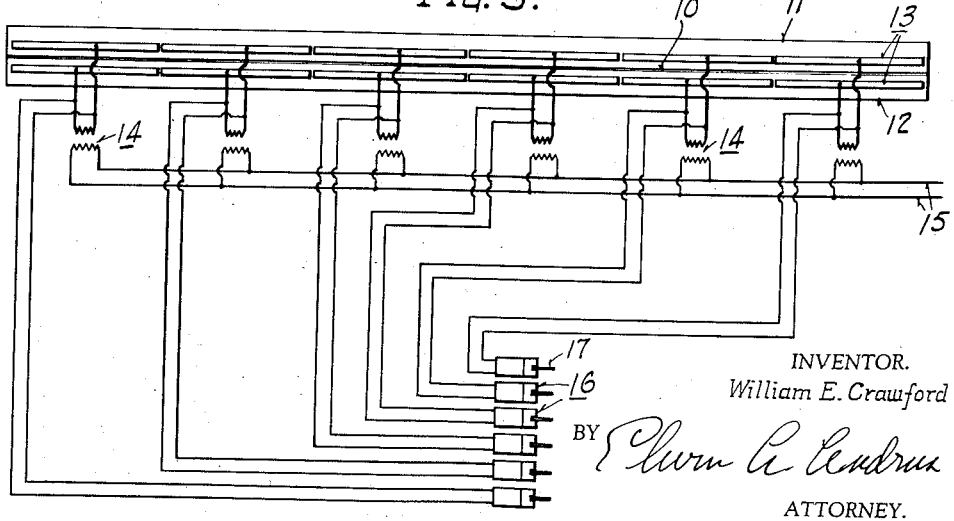

Fig. 4 is a view, partly in section and partly in side elevation, of my device showing the peep opening located in the end of the casing to permit a direct observation of the pointers; and Fig. 5 is a diagrammatic view of the circuit connections for supplying electric currents to pairs of electrodes and the manner of connecting my device to indicate the welding conditions at the different portions of a welding cleft.

Referring now to the drawing, and Fig. 5 in particular, 10 designates a welding cleft which is formed by placing two members 11 and 12 to be welded in parallel relation. The members 11 and 12 may represent the edge portions of a long tubular blank disposed to be welded as in the process of manufacturing pipe.

In the process of manufacturing pipe by flash welding, the edges of the blank are fed toward one another at a rate which will permit the flashing away of a portion of the metal until the edges of the blank throughout their whole length have been brought to a uniform welding condition suitable for uniting the opposed walls; then the edges of the pipe are forced together. In this manner a uniform weld may be effected throughout the whole length of pipe which in commercial work often reaches forty feet.

In the process of flash welding, a plurality of oppositely disposed pairs of electrodes for supplying welding current to the plates 11 and 12 are provided. In the embodiment of the invention disclosed in Fig. 5, six pairs of oppositely disposed electrodes 13 are shown. However, it is to be understood that this is merely for illustrative purposes and that a single pair of electrodes or any desired number may be utilized.

As illustrated, each pair of electrodes is supplied from a transformer 14 which is connected to any suitable power source, such as a transmission line 15. The voltage supplied to the transmission line 15 will depend on the operating conditions to be met.

It has been found in the process of manufacturing pipe that it is very difficult to cut and press the tubular blanks from skelp accurately enough to provide perfectly straight meeting edges. As a result, in the process of feeding the edges relative to one another in the flash welding operations, short lengths will contact causing localized currents to flow with the result that these contacting portions will be heated before the remainder of the approaching edges. There is further danger that the edges may be fed toward one another at a rate causing sticking in regions thereby requiring repeating of the welding operations or scrapping of the blank. It is desirable to have the edges in a substantially uniformly heated condition throughout their entire lengths at the time that they are forced together to complete the welding operation. Therefore a system for keeping the operator informed of the existing conditions is desirable.

In the present invention, a system has been provided for indicating to the operator of the flash welding machine the condition of the edges of the pipe throughout the entire length so that he may properly control the flashing operation. In such a device, since flash welding machines are operated by the ordinary workman, simplicity in the indicating device is imperative.

In the feeding of the edges of the blank toward one another in the performance of flash welding operations, the existence of different conditions along a welding cleft will result in different voltage drops across the cleft at different portions of the pipe. When the voltage drop across the cleft is not uniform throughout, it indicates a difference in the currents flowing and therefore non-uniform welding conditions. Therefore the differences in the voltages measured at different points along the welding cleft or the currents flowing may be utilized to indicate to the operator the conditions of the edges of the blank.

When the opposed edges of the blank or plates have been reduced to a welding condition which is substantially uniform, the current flowing at all points along the welding cleft will be nearly equal. The current will then be varied to develop the desired welding conditions after which the edge portions of the blank forming the welding cleft 10 may be forced together to form a welded seam.

The currents flowing between the opposed pairs of electrodes or at different points along the welding cleft are a function of the voltage of corresponding pairs of electrodes or the voltage across the welding cleft at these points. Further, the welding conditions become substantially uniform when the currents flowing are substantially the same throughout the length of the cleft.

In this embodiment of the invention, voltmeters 16 are connected across the different pairs of electrodes 13. However, ammeters may be utilized, in which case they would be connected into the electrode circuits through current transformers of some well known type.

In order to facilitate the observance of the measurements made by the meters 16, each is provided with a pointer 17 which extends beyond its casing. These pointers may be carried directly by the operating coils of the meters or they may be mounted independently and disposed to be actuated by the meters.

In the present embodiment of the invention, the indicating members are disposed in alignment and are so arranged that when they are actuated in response to different voltages, they will occupy positions within a small enough angle to permit the operator to observe them all at one time.

It is to be understood that other well known means for indicating the measurements made by the meters may be resorted to instead of pointers to meet operating conditions. However, in the embodiment of the invention illustrated, in the interest of simplicity in the drawing, pointers have been shown to represent the indicating means.

Assuming now that the meters are connected to measure the voltage between different pairs of electrodes and that the welding machine is in operation, then the meters connected across the electrodes between which no current is flowing will stand in positions registering full voltage, while the pointers disposed to be actuated by the meters connected across electrodes between which there is current flowing will not be given as great an angular deflection. Therefore the operator will see a plurality of pointers and will know that the welding conditions are not uniform throughout the length of the blank.

When the high portions of the blank have been flashed away and the opposed edges of the blank have become substantially uniform throughout, the same current will flow between the different pairs of electrodes and all the pointers will be deflected to substantially the same angular position. As a result, the operator will see only one pointer and he may readily read the current flow indicated by this one pointer.

In order to facilitate the observance of the pointers 17, when different currents are flowing between different pairs of electrodes 13 or the front pointer when the currents flowing between the different pairs of electrodes are the same, a casing 18 having a peep opening 19 is provided for enclosing the meters.

When the meters can be arranged in the horizontal line, as shown in Fig. 4, the peep opening 19 is made in the end of the casing 18. If available space does not permit mounting the meters in horizontal line, the peep opening 19 may be placed in the front wall near the top of the casing 18 and a mirror 20 disposed in front of the peep opening at an angle of 45°. Thus by looking into the mirror, the pointers may be observed. This permits the standing of the casing on end.

Figure 1:
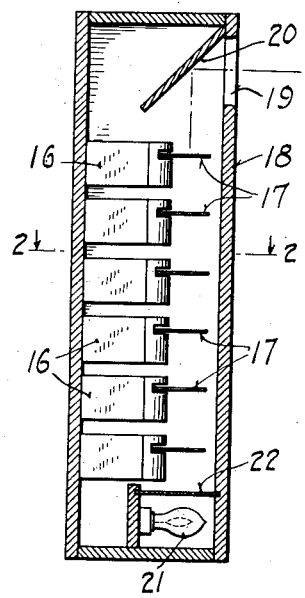
Figure 1 is a view, partly in section and partly in side elevation, showing an indicating device constructed in accordance with my invention.
Figure 2:
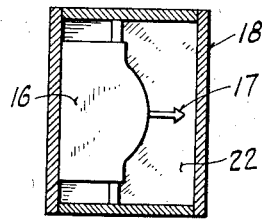
Fig. 2 is a view in section taken on the line 2—2 of Fig. 1.
Figure 3:
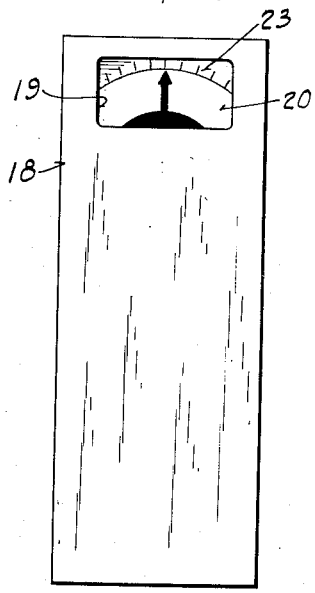
Fig. 3 is a view in front elevation of the structure shown in Fig. 1.

In either case, a light 21 may be mounted in the end of the casing opposite the peep opening to illuminate the pointers. The light is preferably screened by ground glass 22. When illuminating means of this kind is provided in the casing, the pointer will appear dark as shown in Fig. 3.

Since, in performing flash welding operations, the walls of the members to be welded are brought to proper welding condition when a predetermined current flows for a period of time depending on the working conditions, a scale 23 may be mounted on the casing in a convenient place relative to the pointers 17. This scale may be graduated in any suitable manner.

From the foregoing, it will be evident that an indicating system has been provided which may be readily observed by the operator which will indicate generally the welding conditions in different parts of the blank to be welded. Further, when the conditions throughout the blank are substantially uniform, the indications may be readily followed by the operator to ascertain the current flowing between the pairs of electrodes.

Since numerous changes may be made in the above described structure and different embodiments of the invention may be made without departing from the spirit and scope thereof, it is intended that all matter contained in the above description or shown in the accompaying drawing shall be interpreted as illustrative and not in a limiting sense.

I claim:

1. In an indicating system for flash welding machines having a plurality of oppositely disposed electrodes for supplying electric current to perform welding operations, in combination, a plurality of meters connected across the electrodes for measuring the characteristics of the current flowing between the oppositely disposed electrodes in different regions along the cleft being welded, and pointers actuated by the meters for indicating the characteristics of the current measured, the indicating pointers being disposed in alignment to facilitate the observation of differences in angular deflection which indicates variations in the characteristics of the welding currents and welding conditions, and the welding currents flowing when welding conditions are the same to indicate when the machine should be operated to complete the welding operations.

2. In an indicating system for flash welding machines having a plurality of oppositely disposed electrodes for supplying electric current to perform welding operations, in combination, a plurality of meters for measuring the characteristics of the current flowing between the oppositely disposed electrodes, and indicating means disposed to be actuated by the meters to indicate the characteristics of the currents measured, the indicating means being disposed to oscillate about a common axis to facilitate the observation of differences in angular deflection of the indicating means indicating variations in the current characteristics and the welding conditions, and the movement of the indicating means when the welding conditions are the same between the oppositely disposed electrodes and when the welding machine should be operated to complete the welding operations.

3. In an indicating system for flash welding machines having a plurality of oppositely disposed electrodes for supplying electric current to perform welding operations, in combination, a plurality of meters for measuring the characteristics of the current flowing between the oppositely disposed electrodes, pointers disposed to be actuated by the meters to indicate the characteristics of the currents measured, the indicating pointers being disposed to oscillate about a common axis to facilitate the observation of differences in angular deflection of the pointers indicating variations in the current characteristics and the welding conditions, and the movement of the pointers when the welding conditions are the same between the oppositely disposed electrodes and when the welding machine should be operated to complete the welding operations, and a casing having a peep opening therein to permit the sighting of the pointers.

4. In an indicating system for flash welding machines having a plurality of oppositely disposed electrodes for supplying electric current to perform welding operations, in combination, a plurality of meters for measuring the characteristics of the current flowing between the oppositely disposed electrodes, pointers disposed to be actuated by the meters to indicate the characteristics of the currents measured, the indicating pointers being disposed to oscillate about a common axis to facilitate the observation of differences in the angular deflection of the pointers indicating variations in the current characteristics and the welding conditions, and the movement of the pointers when the welding conditions are the same between the oppositely disposed electrodes and when the welding machine should be operated to complete the welding operations, a casing having a peep opening therein to permit the sighting of the pointers, and a light disposed back of the pointers for illuminating the inside of the casing to cause the pointers to stand out and be readily observable.

5. An indicating system for machines for welding long clefts between metallic plates comprising, in combination, a plurality of meters connected across the plates for measuring the currents delivered to different portions of the cleft to be welded, pointers actuated by the meters for indicating the currents delivered at the different portions of the welding cleft and therefore the welding conditions, said pointers being disposed to oscillate about a common axis to facilitate the observance of differences in the welding currents at different portions in the cleft, and a casing provided with a peep opening enclosing the pointers to confine the field of vision whereby the operator may readily observe all the pointers when they are in different angular positions and the first pointer when they are in the same angular positions, thereby to facilitate the continual observance of the welding conditions in all portions of the cleft to be welded, and the welding current when the welding conditions are the same throughout the length of the cleft to indicate when the welding machine should be operated to project the plates into engagement to complete the welding operations.

6. In an indicating system for flash welding machines having oppositely disposed electrodes for supplying electric current to perform welding operations, in combination, a power source for supplying electrical energy to the electrode, a plurality of meters for measuring the characteristics of the electrical energy supplied to the electrodes to perform welding operations, and means disposed to be actuated by the meters for indicating the characteristics of the electrical energy, the indicating means being disposed in predetermined positions relative to one another to facilitate the observation of differences in the electrical characteristics which indicates variations in the welding conditions and when the welding conditions are the same at all points and when the machine should be operated to complete the welding operations.

7. In a machine for flash welding a seam in an article of substantial length wherein the electrical welding energy is supplied to the several longitudinal regions of the seam from a plurality of individual supply units, an indicating device comprising a plurality of meter elements individually connected with the separate welding energy supply units, said meter elements having indicating members arranged in a position to make them effectively observable simultaneously by the operator of the machine, said indicating members being further arranged to be in substantially one line with respect to the operator when the respective members indicate approximately like values and conditions which are proper for the operation of the machine to complete the welding operations, each member deviating from said line when indicating a value other than said like value.

8. In a machine for electrically heating or flash welding a seam in an article of substantial length wherein the electrical welding energy is supplied to the several longitudinal regions of the seam from a plurality of individual supply units, and an indicating device comprising a plurality of electric meter elements employed to indicate the similar electrical supply values of the individual supply units, said meter elements employing separate indications arranged to be simultaneously visually observable by the machine operator, said indications being further arranged to form substantially one common indication when the several indications are of like values and the conditions are proper for operating the machine to complete the welding operations, any indication separating itself from said common indication when it is indicating a value other than said like value.

9. In a machine for flash welding a seam in an article of substantial length wherein the electrical energy is supplied to the several longitudinal regions of the seam from a plurality of individual supply units, an indicating device comprising a plurality of voltage meter elements individually connected with the separate welding energy supply units to indicate the welding potential employed in the several longitudinal regions of the seam, said meter elements having pointers arranged to be simultaneously visually observable by the machine operator and to provide substantially one common indication when the said welding potential in the several longitudinal regions of the seam is of like value and conditions are proper for actuating the machine to complete the welding operations, any pointer separating itself from said common indication when the welding potential in the region of the seam being indicated thereby is different from the potential of the other regions.

10. In an indicating system for flash welding machines having a plurality of oppositely disposed electrodes for supplying electric current to perform welding operations, in combination, a plurality of meters connected across the electrodes to measure the electric current flowing between the different pairs of electrodes, correlated means actuated by the meters for indicating the currents measured, the correlated indicating means associated with the different pairs of electrodes being disposed to so register that when the currents are the same between the pairs of electrodes only one of the units of the indicating means will be observable and will indicate the current flowing between each of the pairs of electrodes to show when the welding conditions are the same throughout the length of the article being welded and when the machine should be operated to complete the welding operation.

WILLIAM E. CRAWFORD.